Jan. 3, 1967  N. H. PENGILLY  3,295,865
AUTOMATIC SAFETY DRAWBAR HITCH
Filed July 9, 1965

INVENTOR
Norman Hedley Pengilly

By
Watson, Cole, Grindle & Watson
ATTORNEYS

United States Patent Office 3,295,865
Patented Jan. 3, 1967

3,295,865
AUTOMATIC SAFETY DRAWBAR HITCH
Norman Hedley Pengilly, The Meadows, River Road,
Canowindra, New South Wales, Australia
Filed July 9, 1965, Ser. No. 470,690
Claims priority, application Australia, July 10, 1964,
46,815/64
9 Claims. (Cl. 280—475)

This invention relates to a hitch which may be used to couple and uncouple an implement to a tractor or like vehicle.

It is difficult to accurately position the drawbar of a tractor to the matching part of an implement to position a coupling bolt and many accidents have taken place in such operations when safety rules have not been observed. The present invention provides a device which is not so critical in the relative positioning of the tractor and implement as has hitherto been the case and permits such operation to be carried out without the tractor driver leaving the driving seat of the tractor.

The present invention provides apparatus for coupling a tractor or the like to a trailing implement comprising a guideway for attachment to the implement, a loop member attached to the guideway, a latch member positioned for movement with respect to the guideway, the latch member having a mounting portion slidable in or on the guideway, a locking portion and a ground engaging portion, the latch member being shaped and arranged to lock a hook, ball or like member on a tractor drawbar or attachment thereon when the latter is elevated to take the weight of the implement and the hook, ball or the like is positioned in the loop and vice versa for uncoupling.

Two preferred forms of the present invention are hereinafter described by way of example with reference to the accompanying drawings in which.

Figure 1:
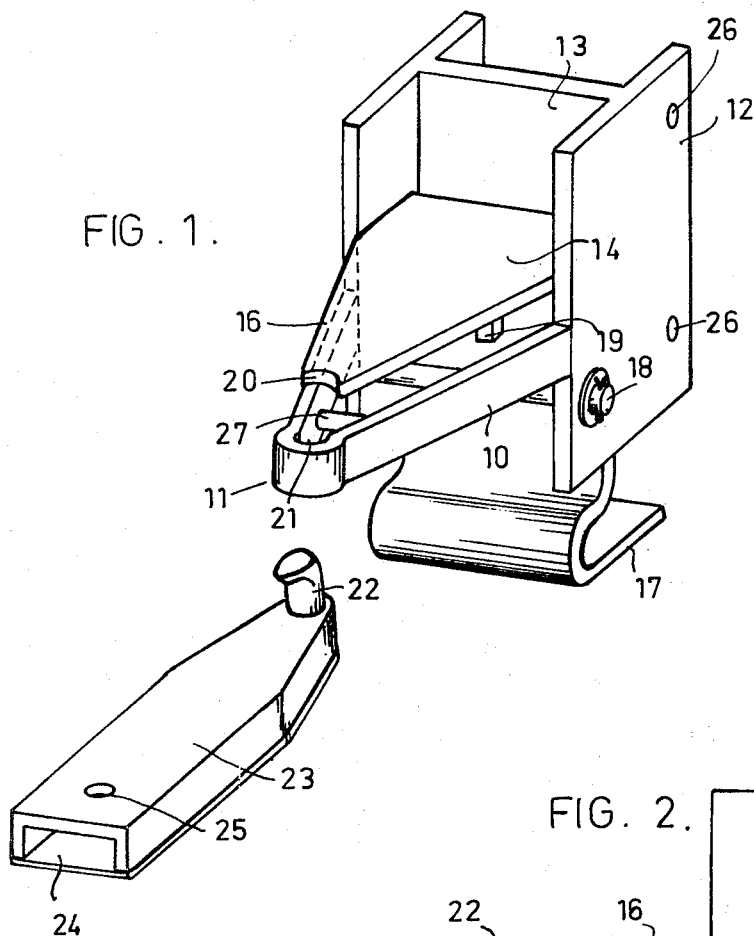
FIGURE 1 is a pictorial view of one form of the apparatus of this invention with a cooperating drawbar attachment adjacent thereto.
Figure 2:
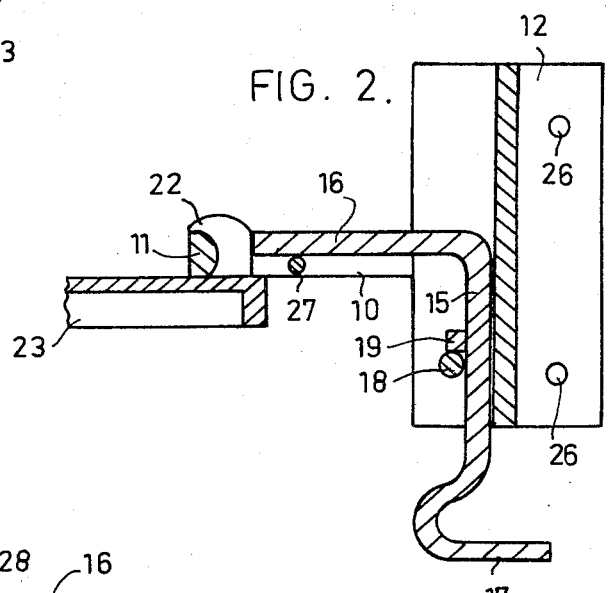
FIGURE 2 is a sectional side elevation of the apparatus of FIGURE 1 with the drawbar attachment coupled to the apparatus.

A loop member 10 having a narrow front end 11 is secured to a frame member 12 having a guideway 13. The loop member is of generally V configuration when viewed in plan and its free ends are attached to the frame member 12.

A latch member 14 is mounted in the guideway 13. It has a mounting portion 15, a forward transverse locking portion 16 and a trailing support portion 17. There is a detachable retaining pin 18 extending between the guideway walls of frame member 12 and ahead of the mounting portion 15 to retain the latch member 14 in position. An abutment 19 is provided on the mounting portion 15 to engage with the retaining pin 18 and limit the downward movement of the latch member 14. The trailing portion 17 limits the upward movement by engagement with the frame member 12.

The locking portion 16 is shaped to fit inside the V of the loop member 10. It has an arcuate forward end portion 20 to provide, with a cooperating portion 21 in the front end of the loop member 11, a bearing surface for a hook member 22 mounted on a drawbar attachment member 23. The latter has an open box section 24 which slides over a drawbar not shown and is attached thereto by a bolt passing through hole 25 and a matching hole in the drawbar.

In operation the frame member 12 is mounted on a trailed implement by bolts passing through holes 26 and a cooperating portion on the implement. The drawbar attachment is mounted on a tractor drawbar as aforespecified. The tractor is reversed and the hook 22 which has a forwardly directed portion, positioned underneath the loop member 10. With the trailing support portion 17 resting on the ground the locking portion 16 of the latch member 14 is positioned above the loop member 10. When the tractor drawbar is raised and the tractor if necessary moved forward, the weight of the implement is taken by the drawbar and the hook member 22 is locked in position by portions 20 and 21 as the latch member 14 falls downwards under its own weight. The reverse takes place when the implement is to be uncoupled, the latch member 14 being lifted, relative to the loop member 10 due to the weight of the implement.

To limit the downward movement of the locking portion 16 there may be a transverse bar portion 27 extending between the arms of the loop member 10.

The engaging surfaces of the loop member 10 and the hook member 22 are rounded to provide a bearing surface therebetween.

Figure 3:
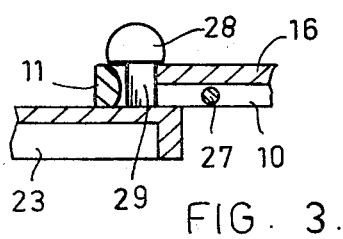
FIGURE 3 is a sectional side elevation of another form of this invention.

In FIGURE 3 the hook member 22 is replaced by a part ball member 28. It is mounted on a shank 29 which is dimensioned so that when it is displaced forward it allows portion 20 to be lifted clear of the ball member 28 for uncoupling.

I claim:

1. In a tractor trailer combination, a coupling member secured to the tractor drawbar and a connecting member secured to the trailer, a guideway on the connecting member, a latch member slidably mounted in the guideway, a ground engaging portion on the latch member, a loop member secured to the connecting member, said latch member having a portion for engagement with the loop member to retain the coupling member in engagement therewith when the tractor drawbar is initially positioned with the coupling member underlying the loop member and is subsequently raised to allow the latch member to move under its own weight into engagement with the coupling member and the loop member.

2. The combination as claimed in claim 1 wherein the coupling member is a hook secured to the tractor drawbar, the free end of the hook being directed away from the connecting member.

3. The combination as claimed in claim 1 wherein the coupling member is a part. spherical ball secured to the tractor drawbar.

4. The combination as claimed in claim 1 wherein the connecting member is a length of H beam, the guideway being defined by the web and two of the arms of the beam, the said arms being on the same side of the web.

5. Apparatus for coupling a tractor to a trailing implement comprising a guideway for attachment to the implement, a loop member attached to the guideway, a latch member positioned for movement with respect to the guideway, the latch member having a mounting portion slidable on the guideway, a locking portion and a ground engaging portion, the latch member being shaped and arranged to lock a connecting member mounted on the tractor drawbar in the loop member when the tractor drawbar is lifted with the connecting member located in the loop member.

6. Apparatus as claimed in claim 5 wherein the guideway is channel shaped and the loop member is V shaped with the arms of the V attached to the arms of the channel.

7. Apparatus as claimed in claim 5 wherein the guideway includes a retaining pin, the latch member being positioned between the guideway and the retaining pin.

8. Apparatus as claimed in claim 5 including a stop member on the loop for engagement with the locking portion of the latch member when it is in engagement with the connecting member.

9. Apparatus for coupling a tractor to a trailing implement comprising a guideway for attachment to the implement, a loop member attached to the guideway, a latch member positioned for movement with respect to the guideway, the latch member having a mounting portion slidable on the guideway, a locking portion and a ground engaging portion, the locking portion being shaped to lock a connecting member mounted on the tractor drawbar in the loop member when the loop member is positioned above and brought into engagement with the connecting member.

References Cited by the Examiner

UNITED STATES PATENTS

| | | | |
|---|---|---|---|
| 943,024 | 12/1909 | Jones | 280—475 |
| 1,860,391 | 5/1932 | Meyer | 280—477 |
| 3,150,884 | 9/1964 | Drott | 280—475 X |

FOREIGN PATENTS 463,247   3/1937   Great Britain.

LEO FRIAGLIA, *Primary Examiner.*